March 8, 1966     E. A. HALL     3,238,658
AUTOMATIC FISH CATCHER
Original Filed Feb. 14, 1963
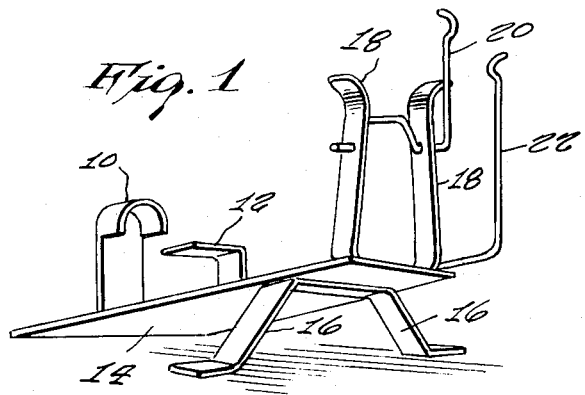
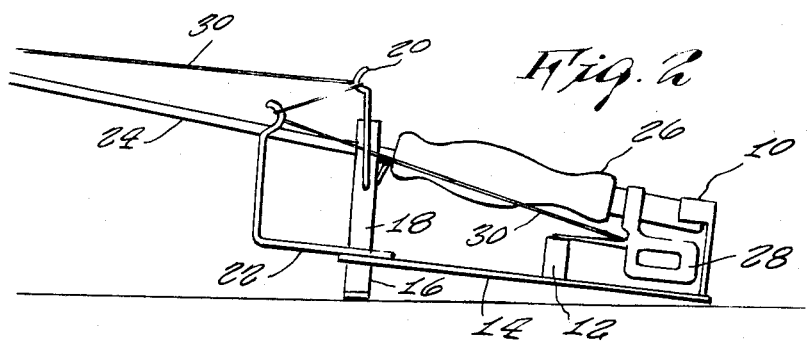
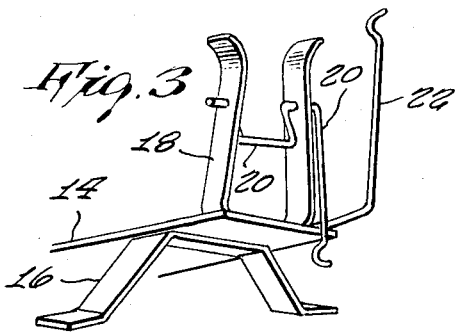
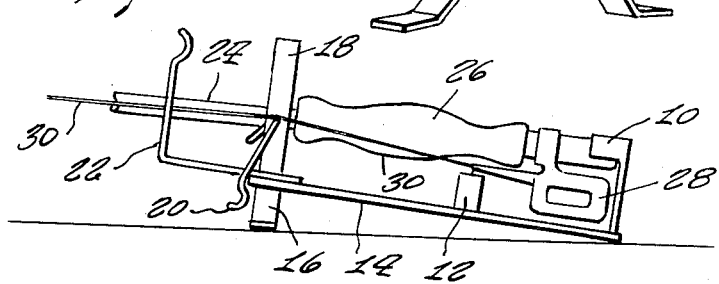
INVENTOR.
EMMETT A. HALL 3,238,658
AUTOMATIC FISH CATCHER
Emmett A. Hall, Vernal, Utah
(Box 179, Duchesne, Utah)
Substituted for abandoned application Ser. No. 258,413, Feb. 14, 1963. This application June 28, 1965, Ser. No. 471,500
2 Claims. (Cl. 43—15)

My application is a substitute application for my application filed February 14, 1963, Serial No. 258,413, now abandoned.

My invention is directed toward automatic fish catchers.

It is an object of my invention to provide an automatic fish catcher which can hold a fishing rod and reel in position at water's edge and incorporates means to automatically set a fish hook suspended in the water from a line carried by the rod into a fish when bait has been taken by the fish from the hook.

Another object of my invention is to provide a new and improved catcher of the character indicated which can play a hooked fish.

Still another object of my invention is to provide a new and improved catcher of the character indicated which can be easily manufactured at low cost.

All of the foregoing and still further objects and advantages of my invention will now be explained with reference to this specification and to the drawings wherein:

FIGURE 1 is a perspective view of my invention;

FIGURE 2 is a side view of my invention with a fishing pole fixed therein;

FIGURE 3 is a perspective view of my invention in tripped position; and

FIGURE 4 is a view similar to FIGURE 2 but shown in tripped position.

Referring to the drawings, there is shown a back pole holder 10, a trip block 12, a base 14, legs 16, a front pole holder 18, a trip lever 20 and a line guide 22. A fishing pole 24 has a handle 26. An automatic reel 28, as for example, the type disclosed in the patents to Van Horn, No. 787,317, and Boyle, No. 599,138, is secured to the end of the handle 26. The handle 26 is positioned between the front and back holders 10 and 18 and is held in position thereby. A fishing line 30 extends from reel 28 around line guide 22 and trip lever 20 and thereafter extends along the pole and into the water with a baited hook or hooks on the end together with sinkers, etc. The trip lever 20 is provided with a substantially V-shaped portion positioned between the upright arms of front pole holder 18. Each end of the V-shaped portion has a horizontal extension pivotally received in opposed apertures in the upright arms. One of the extensions is turned at right angles to the pivotal axis of the U-shaped portion and projects outwardly therefrom and is provided on its end with a line engaging bend. The Van Horn and Boyle patents each illustrate a reel provided with a brake and a trigger arm for releasing the brake. The instant invention contemplates mounting such a reel on a fishing rod handle with its trigger arm engaged with the trip block 12. Upon tripping of the trip lever 20 the rod will move from its upper set position to a lower position and actuate the trigger arm of the reel for releasing the brake thereon.

FIGURE 2 shows the pole in the set position. When a fish takes the hook and pulls on the line, the trip lever is pulled forward and is tripped. This permits the pole to drop approximately one inch, thus tripping the reel which sets the hook in the fish. The tripped position of my invention without the pole is shown in FIGURE 3; the tripped position with the rod in place is shown in FIGURE 4. As shown in FIGURE 4, the fish line is free to move forward and backward.

After the hook has been set in the fish, the fisherman can either lift the pole from the device or can leave it in place. In the latter event, the device will play the fish right up to the end of the pole. This leaves the fisherman free to watch and net the fish.

The trip block and back pole holder are both adjustable to accommodate poles of different dimensions.

While I have described my invention with particular reference to the drawings, my protection is to be limited only by the terms of the claims which follow.

I claim:

1. An automatic fish catcher comprising a flat base, and a front leg providing an incline from the front to the back of the base when resting on a horizontal surface, front and back pole holders secured to said base in a predetermined longitudinal spacing, an L-shaped tripping block attached to the base, and projecting transversely above and over a portion of the base between the said pole holders, in further combination with means for retaining a fishing line comprising a pivotal lever attached to the front pole holder, and a fixed line guide spaced from said pivotal lever for receiving the fishing line in an entwined position preventing the line from being played out, said lever being adapted to be actuated upon a predetermined tension upon the fishing line to be moved to position releasing the said fishing line, and, additional means for supporting a fishing pole at a raised and lowered level, said latter means being responsive to the releasing movement of the lever to move from the higher to the lower position, causing the fishing pole to descend, in combination with a fishing pole having a reel mounted thereon, adjacent the tripping block, said reel including means for holding the fishing line from being played out from the reel, and a trigger means for releasing said fishing line, said tripping block and said trigger being so arranged that the downward movement of the fishing pole causes the trigger to come in contact with the tripping block, thereby releasing the said fishing line and allowing the line to be played out.

2. A device as in claim 1, wherein said lever comprises a U-shaped member pivotally mounted on the front pole holder, having a horizontal portion parallel and spaced from the axis of rotation, and including a projection at right angles to the axis of rotation, having means for engaging and entwining the fishing line.

References Cited by the Examiner

UNITED STATES PATENTS

| 2,698,725 | 1/1955 | Tripplett | 43—21.2 X |
| 2,931,121 | 4/1960 | Torbett | 43—21 |
| 2,964,868 | 12/1960 | Bennett | 43—15 |
| 3,058,251 | 10/1962 | Brooks | 43—21.2 |

SAMUEL KOREN, *Primary Examiner.*

W. H. CAMP, *Assistant Examiner.*